UNITED STATES PATENT OFFICE.

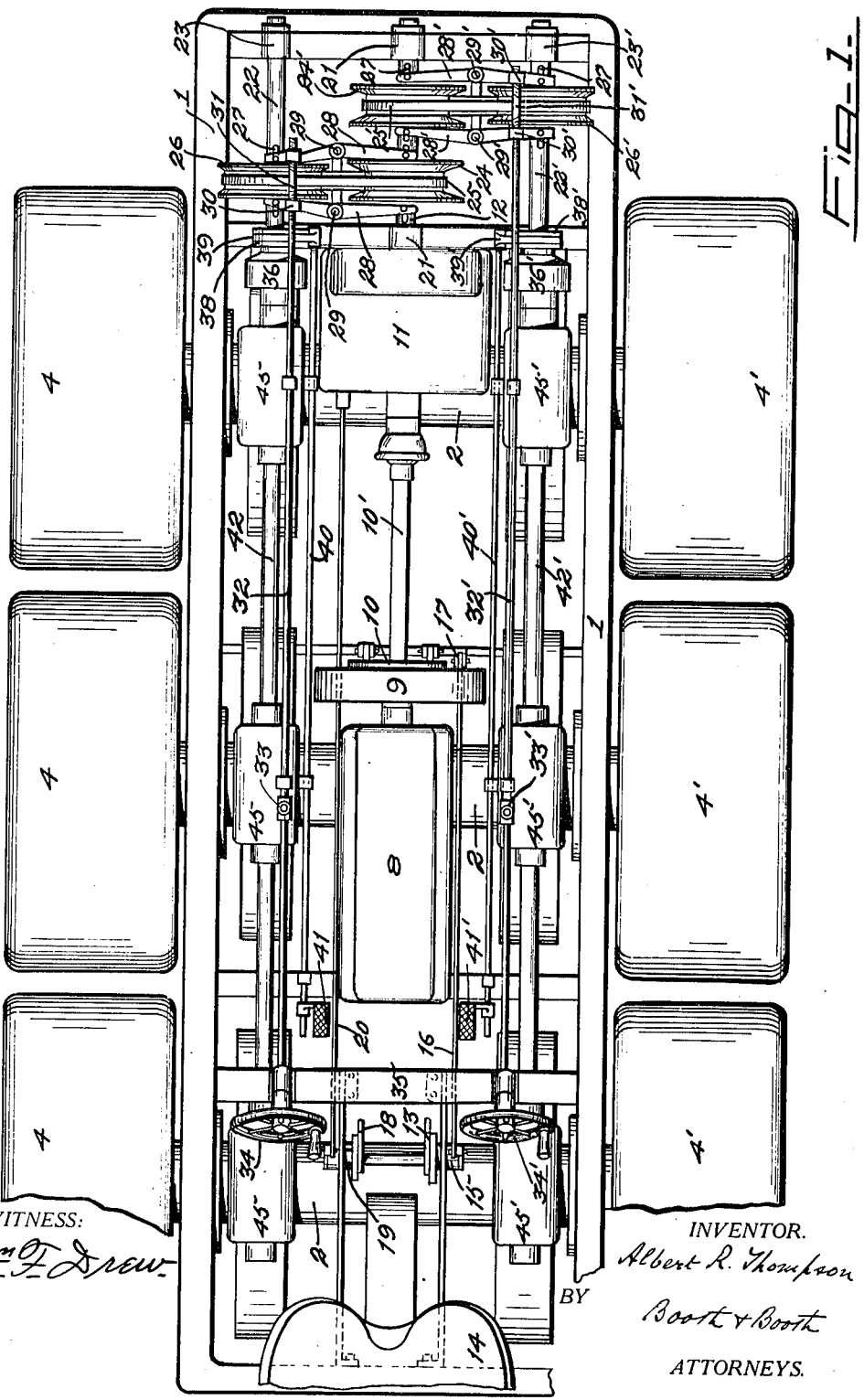

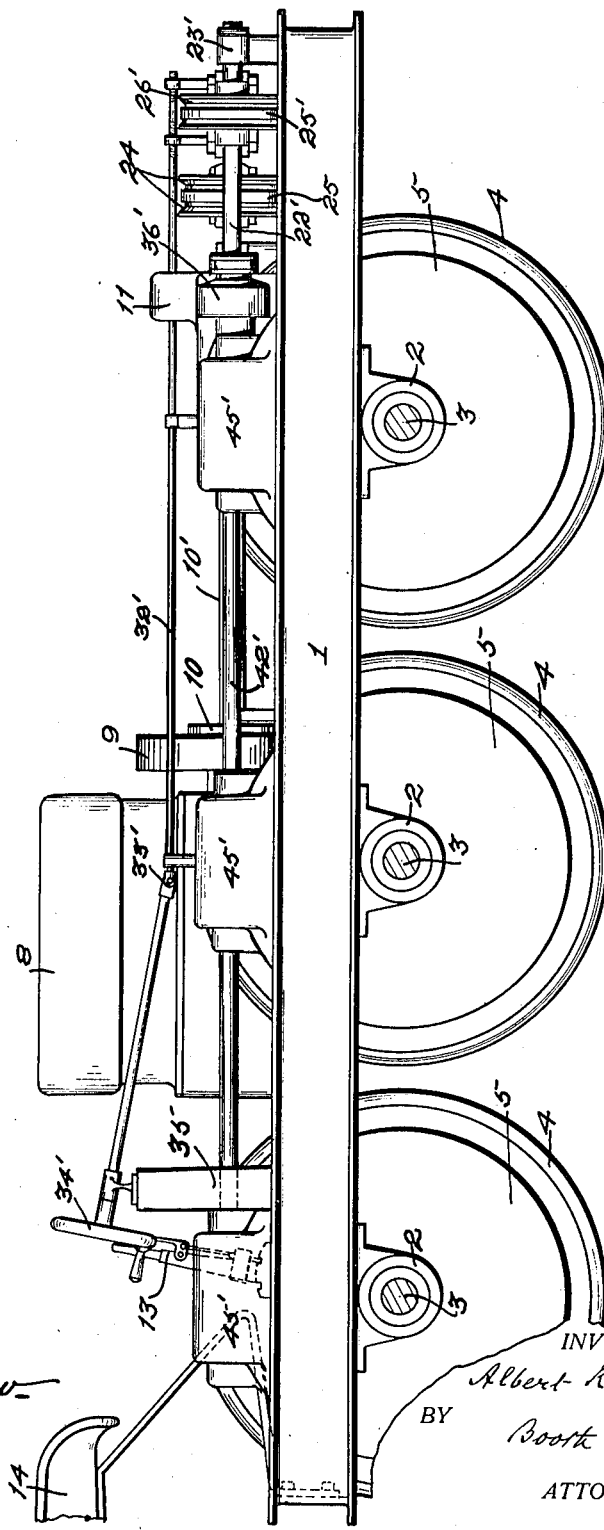

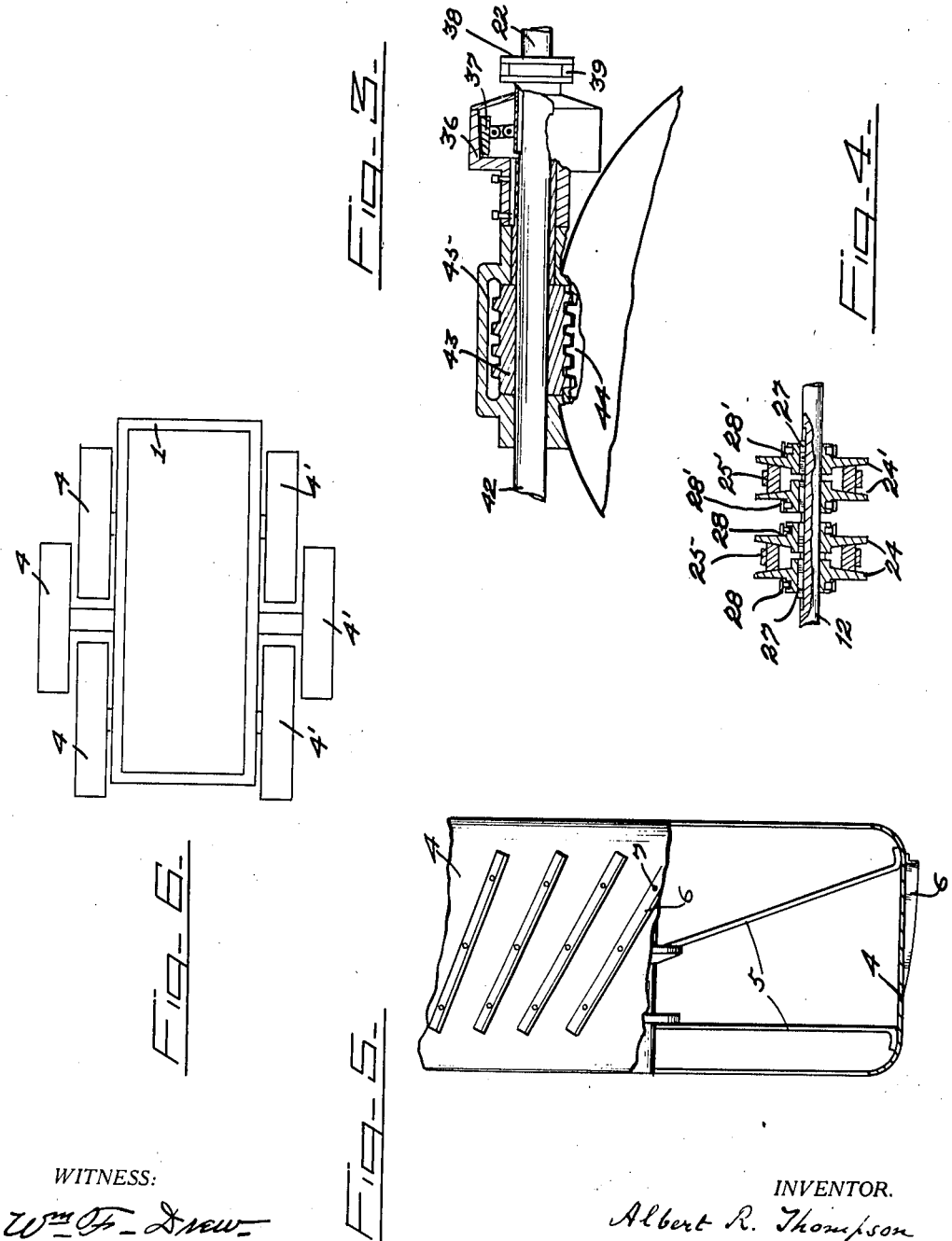

ALBERT R. THOMPSON, OF SAN JOSE, CALIFORNIA, ASSIGNOR TO ANDERSON-BARNGROVER MFG. CO., OF SAN JOSE, CALIFORNIA, A CORPORATION OF CALIFORNIA.

TRACTION-ENGINE.

1,292,972. Specification of Letters Patent. Patented Jan. 28, 1919.

Application filed May 28, 1917. Serial No. 171,358.

*To all whom it may concern:*

Be it known that I, ALBERT R. THOMPSON, a citizen of the United States, residing at San Jose, in the county of Santa Clara and State of California, have invented certain new and useful Improvements in Traction-Engines, of which the following is a specification.

My invention relates to wheeled traction engines, of a type equally adaptable for use either upon relatively hard and smooth roads, or upon the uneven, broken, or soft surfaces of agricultural land.

My invention is an improvement upon the traction engine for which I have applied for United States Letters Patent under date of Dec. 4, 1916, said application bearing the Serial No. 134,843.

The present invention includes the advantage described in said co-pending application, namely the provision of a tractor capable of being guided and handled over any condition of ground surface without the employment of a guiding or steering wheel. By this construction, the entire weight of the tractor is carried by the traction wheels, and therefore the maximum tractive effort for a given power and weight is secured, and at the same time, the machine may be made more compact and thus easier to handle in limited spaces.

The guiding of the tractor embodying the present invention is accomplished by the same means as that employed in the machine described in said co-pending application. The driving wheels upon the two sides of the machine are independently connected with the engine by means of variable speed mechanisms, there being provided one such mechanism to drive the wheels upon each side. By this construction, the wheels of one side of the machine may be operated at a speed greater or less than that of the wheels upon the other side, thus giving the machine a constant and continuous effort, either for the purpose of following a curved path or for counteracting the sideling effect incident to working upon a side slope or to working with the wheels of one side of the machine in relatively soft ground, the latter condition being met with, for example, in plowing, where the wheels of one side of the machine run in the previous furrow.

The object of the present invention is to provide such a traction engine in which the use of endless flexible tracks is unnecessary to provide the proper traction. By doing away with said flexible tracks, the machine can not only be manufactured at less cost, but the operating expense of the machine is greatly reduced as compared with that of a track laying machine. In the latter type of machine, the greatest operating expense occurs in renewal and repair of the flexible tracks, said tracks operating under the most unfavorable conditions as regards lubrication and dirt. In my present tractor, the only exposed movable parts are the driving wheels, so that there is no opportunity for grit to work into any of the bearings of the machine. At the same time, I am enabled by the construction to be presently described, to provide a machine having sufficient traction to negotiate any condition of ground surface.

The invention is hereinafter described and is herewith illustrated in its preferred form, but it is to be understood that changes may be made in the form and construction of the device, within the scope of the appended claims, without departing from the spirit of the invention.

With this in view, the invention will now be described with reference to the accompanying sheets of drawings, wherein;

Figure 1 is a plan view of my traction engine, certain parts being omitted for the sake of clearness.

Fig. 2 is a part sectional side elevation of the same.

Fig. 3 is a partly broken detail, enlarged, of a portion of the drive mechanism.

Fig. 4 is a sectional detail of the variable speed mechanism.

Fig. 5 is a partly broken detail enlarged, of one of the wheels.

Fig. 6 is a diagrammatic view, showing a modified arrangement of the driving wheels.

In the drawings, the reference numeral 1 designates the frame of the machine, which is preferably rectangular in form, and provided with cross members, as shown in Fig. 1. Said frame is supported by means of stationary axle housings 2, preferably three in number, within which are rotatably carried axle driving shafts 3, the latter being shown in Fig. 2. The axle shafts 3, which project beyond the ends of the housings 2, carry upon said projecting ends the driving and supporting wheels 4 and 4', the wheels 4 being mounted upon one side and the wheels 4' upon the other side. As shown in Fig. 5, the wheel rims which are supported by webs 5, are preferably inwardly curled at their edges, and said rims are also preferably provided with grousers 6, the latter being removably secured to said rims by means of bolts 7. It is understood that said grousers may be removed from the wheel rims when the machine is to be used upon paved roads, Figs. 1 and 2 showing the wheels with the grousers removed.

A source of motive power 8, here shown as of the internal combustion engine type is mounted upon the frame 1, toward the rear thereof. The crank shaft of said motor carries the usual balance wheel 9, within which is housed a friction clutch 10 of any well known form. From this clutch the power is transmitted, by a forwardly extending shaft 10', to a suitable reversing gear inclosed within a housing 11, by means of which the driven shaft 12 may be rotated in either direction to drive the vehicle either forward or backward.

The clutch 10, as shown, is controlled by a lever 13 conveniently located with respect to the driver's seat 14, and connected through a short rock-shaft 15, and a longitudinally disposed rod 16, with a member 17, adapted to operate the movable clutch member. The reversing gear 11 is controlled by a similar lever 18, operating through a short rock-shaft 19, and a longitudinally disposed rod 20, said mechanism being shown in Fig. 1 of the drawings.
The shaft 12 is extended forwardly from the reversing gear 11, and is supported in suitable bearings 21 carried by the forward transverse frame members. Parallel with said shaft and located upon either side of the frame, are drive shafts 22 and 22', Fig. 1, supported by suitable journals 23 and 23'. Said drive shafts 22 and 22' are connected with and driven by the engine shaft by means of independent variable speed power transmitting mechanisms.

For the purpose of illustration, I have shown a preferred form of such mechanism, comprising adjustable split V-groove pulleys 24 and 24', Figs. 1 and 4, carried by the engine shaft 12 and connected by means of suitable belts 25 and 25', respectively, with similar pulleys 26 and 26', Fig. 1, carried by the respective drive shafts 22 and 22'. These pulleys are split in the plane of the center or bottom of the groove, and the two halves thereof are adjustable toward or away from each other to make the effective diameter of the pulley larger or smaller. For this purpose, the pulley members are suitably mounted upon their respective shafts, and are prevented from turning thereupon by keys or splines 27, as seen in Fig. 4.
The sections of the driving pulley 24 are connected with the corresponding sections of the driven pulley 26 by means of levers 28, fulcrumed at 29 and preferably forked at their ends, as shown in Fig. 4. Said levers are provided with right and left threaded nuts 30, Fig. 1, through which passes a turn-buckle screw 31. Therefore, when said turn-buckle screw is rotated in one direction, the inner ends of the levers 28 are moved apart and their outer ends brought together. The effective diameter of the driven pulley 26 is thus increased, while that of the driving pulley is correspondingly decreased, the tension on the belt remaining constant. The speed of the driven pulley relative to that of the driving pulley is thus decreased and the torque is increased. Opposite rotation of the turn-buckle screw 31, of course, produces opposite variation in speed and torque.

The sections of the driving pulley 24' are similarly connected with corresponding sections of the driven pulley 26' by means of levers 28', fulcrumed at 29' and operated by means of a turn-buckle screw 31', which engages nuts 30' carried by said levers. The turn-buckle screws 31 and 31' are rotated by means of longitudinally disposed shafts 32 and 32' respectively, universally jointed at 33 and 33', and carrying at their rear ends hand wheels 34 and 34'. A bracket 35 supports said hand wheels within easy reach of the driver.

The drive shafts 22 and 22' extend rearwardly and are provided with suitable power transmitting clutches indicated at 36 and 36' in Fig. 1, one of such clutches, being shown in detail in Fig. 3. The preferred form of clutch is here shown as comprising an outer female cone member 36, within which is a movable male cone member 37, the latter being expanded into engagement with said female cone member by means of a sliding member 38, adapted to be engaged by a forked arm 39 carried by the forward end of a longitudinally disposed rod 40, Fig. 1, the rear end of said rod carrying a pedal 41, within easy reach of the driver. The clutch 36' upon the opposite shaft 22' is similarly operated by means of a member 38', a forked arm 39', a longitudinally disposed rod 40' and a pedal 41'.

The driving clutch members 36 and 36' are fastened upon respective drive shafts 42 and 42' extending rearwardly from said clutches and having driving connection with each of the axle shafts 3. I prefer to employ a worm gear for this driving connection, as shown in Fig. 3 of the drawings, the shaft 42 carrying a worm 43 which meshes with a worm wheel 44, the entire mechanism being inclosed within a housing 45. As shown in Fig. 1, each stationary axle housing 2 carries two of said worm gear housings, those upon one side of the machine being indicated by 45 and those upon the other side by 45'.

The axle shafts 3 are understood to be divided in the middle, the shafts of the wheels 4 being independent of those of the opposite wheels 4'. The worm wheels within the housings 45 are fast upon the axle shafts which drive the wheels 4 upon that side of the machine, and the worm wheels within the housings 45' are fast upon the axle shafts which drive the wheels 4' upon the opposite side. Thus it will be seen that the three wheels upon one side of the machine are positively driven in unison, as are the three wheels upon the other side of the machine, but that the wheels upon one side are driven independently of the wheels upon the other side. Thus, the operator can control the wheels upon either side independently of those upon the other side by means of the variable speed mechanisms and the clutches 36 and 36'. If the machine tends to run toward one side, or if the operator desires it to do so, as when traveling in a curved path, the variable speed mechanisms may be relatively adjusted, by means of the hand wheels 34 and 34', to cause the wheels upon one side to have any desired constant speed relative to that of the wheels upon the other side.

The variable speed mechanism may also be controlled simultaneously to provide any desired speed and torque ratio between the engine and the driving wheels. When it is desired to make a short turn, the wheels of one side may be entirely disconnected from the engine by means of the clutch 36 or 36', as the case may be. The stationary wheels then become a pivot about which the driving wheels travel to turn the machine. It is to be expected that in turning there will be a certain amount of slip between the wheels and the ground, but this slip is no more than occurs in tractors using an endless flexible tread having an elongated ground contact surface.

The wheels, it will be understood, are all rigidly mounted upon the frame, and all the wheels upon either side of the machine are driven together. Therefore, if one wheel either rises upon an elevation in the ground surface, or passes over a depression therein, at least two wheels of that side of the machine will have contact with the ground, and will therefore provide tractive effort while the wheel that is raised off the ground will not race, but will continue to revolve at the same speed. The machine thus has much greater area of contact with the ground, and therefore greater tractive effort, than a machine employing only two driving wheels.

It is to be understood that a greater number of wheels may be employed upon each side of the machine if desired, all of said wheels being mounted and connected for driving in a manner similar to those described above. Likewise, the wheels may be staggered as shown in Fig. 6 of the drawings if it is desired to reduce the total length of the tractor.

I claim:

1. In a traction engine, a plurality of driving and supporting wheels located upon each side of the longitudinal axis, the wheels upon one side being independent of those on the other side, a source of motive power carried by said wheels, and a pair of independent variable speed power transmitting mechanisms, one of said mechanisms connecting said source of motive power in driving relation with all the wheels upon one side of the vehicle, whereby they are driven in unison, and the other of said mechanisms connecting said source of motive power in driving relation with all the wheels upon the other side of the vehicle, whereby they are driven in unison, but independently of those on the first side of the vehicle.

2. In a traction engine, a plurality of driving and supporting wheels located upon each side of the longitudinal axis, the wheels on one side being operatively independent of those upon the other side, an independent variable speed power transmitting mechanism and a pair of power transmitting clutch members connecting said source of motive power in driving relation with the wheels on each side, and means for independently controlling said power transmitting mechanisms and said clutches.

3. In a traction engine, a plurality of driving and supporting wheels located upon each side of the longitudinal axis, the wheels upon one side being independent of those upon the other side; a source of motive power carried by said wheels; a pair of independent variable speed power transmitting mechanisms, and a pair of independent power transmitting clutches, one of said power transmitting mechanisms and one of said clutches connecting said source of motive power with all the wheels upon one side, and the other power transmitting mechanism and clutch connecting said source of motive power with the wheels upon the other side; and means for independently controlling said power transmitting mechanisms and said clutches.

4. A traction engine comprising a frame; a plurality of driving and supporting wheels located upon each side thereof, those on one side being independent of those on the other side; a source of motive power carried upon said frame; a driving shaft extending forwardly from said source of power; a power transmitting shaft mounted at each side of said frame, parallel with said driving shaft, one of said power transmitting shafts having driving connection with all said wheels on that side to drive them in unison, and the other of said shafts having driving connection with all of said wheels on the other side to drive them in unison; and a pair of independently controlled variable speed power-transmitting mechanisms connecting said driving shaft one with one of said transmission shafts, and the other with the other of said transmission shafts.

In testimony whereof I have signed my name to this specification in the presence of two subscribing witnesses.

ALBERT R. THOMPSON.

Witnesses:
Wm. F. Booth,
D. B. Richards.